(12) United States Patent
Higashi

(10) Patent No.: US 8,535,967 B2
(45) Date of Patent: Sep. 17, 2013

(54) METHOD AND SYSTEM FOR ETCHING A DIAPHRAGM PRESSURE SENSOR

(75) Inventor: Robert Higashi, Shorewood, MN (US)

(73) Assignee: Honeywell International Inc., Morristown, NJ (US)

( * ) Notice: Subject to any disclaimer, the term of this patent is extended or adjusted under 35 U.S.C. 154(b) by 308 days.

(21) Appl. No.: 12/915,356

(22) Filed: Oct. 29, 2010

(65) Prior Publication Data

US 2012/0104521 A1    May 3, 2012

(51) Int. Cl.
*H01L 21/00*    (2006.01)
(52) U.S. Cl.
USPC .......... 438/53; 438/43; 438/48; 438/49; 438/52; 257/414; 257/419
(58) Field of Classification Search
USPC .......... 438/52, 53, 48, 49; 257/419, 414
See application file for complete search history.

(56) References Cited

U.S. PATENT DOCUMENTS

| | | | | |
|---|---|---|---|---|
| 5,172,205 A | * | 12/1992 | French et al. | 257/414 |
| 5,877,039 A | * | 3/1999 | Tanizawa | 438/53 |
| 2011/0165719 A1 | * | 7/2011 | Solzbacher et al. | 438/53 |

* cited by examiner

*Primary Examiner* — Long K Tran
(74) *Attorney, Agent, or Firm* — Kermit D. Lopez; Luis M. Ortiz; Ortiz & Lopez, PLLC

(57) ABSTRACT

A method for etching a diaphragm pressure sensor based on a hybrid anisotropic etching process. A substrate with an epitaxial etch stop layer can be etched utilizing an etching process in order to form a diaphragm at a selective portion of the substrate. The diaphragm can be oriented at an angle (e.g., 45 degree) with respect to the substrate in order to avoid an uncertain beveled portion in a stress/strain field of the diaphragm. The diaphragm can be further etched utilizing an etch finishing process to create an anisotropic edge portion on the major areas of the diaphragm and optimize the thickness and size of the diaphragm. Such an approach provides an enhanced diaphragm structure with respect to a wide range of pressure sensor applications.

15 Claims, 8 Drawing Sheets

METHOD AND SYSTEM FOR ETCHING A DIAPHRAGM PRESSURE SENSOR

TECHNICAL FIELD

Embodiments are generally related to pressure sensing devices and techniques. Embodiments are also related to etching techniques. Embodiments are additionally related to the etching of a pressure sensor diaphragm.

BACKGROUND OF THE INVENTION

Pressure sensors are employed in a wide range of pressure sensing applications in order to convert change in pressure of a fluid (e.g., gas, water etc) into a corresponding electric signal. Such pressure sensors typically include a diaphragm, a transmitter and a pressure detection unit to measure pressure of the fluid. The diaphragm includes a receiving surface for receiving the pressure with respect to the fluid and adding load to the transmitter. The diaphragm can be formed by etching a portion of wafer (e.g., silicon) with a desired thickness. The sensitivity of a piezoresistive based pressure sensor is highly dependent on the final diaphragm thickness and the position of a resistor relative to the edge of the diaphragm.

One prior art approach, for example, employs a KOH (potassium hydroxide) etching in order to form a pressure sensing diaphragm with an epitaxial etch stop on a wafer to control the diaphragm thickness. FIG. 1 illustrates a top view of a diaphragm pressure sensor 100 fabricated utilizing a prior art etching process. A wafer 115 (e.g., silicon) with an epitaxial layer 160 shown in FIG. 2 is conventionally etched in order to form a diaphragm 125 based on the KOH anisotropic etching method. The KOH etching, however, requires a relatively larger hole in the wafer due to 54.7 degree crystal etch plane. As a result, a chip for forming the diaphragm must be larger and therefore fewer die are produced per wafer, which crucially affects the device performance and manufacturing yield. In another prior art approach, a DRIE (deep reactive ion etching) process can be employed to produce a straight sidewall hole in the silicon wafer in order to create the diaphragm. One of the problems associated with such prior art approach is that the etch depth control is not enough to produce a satisfactory yield for high sensitivity devices.

Alternatively, a hybrid process combining the DRIE etching with KOH etching and the etch stop layer with an original configuration can be adapted for etching the diaphragm of the pressure sensor. FIG. 3 illustrates a top view of a diaphragm pressure sensor 200 fabricated utilizing a prior art etching orientation with the hybrid etching process. A wafer 215 (e.g., silicon) with an epitaxial layer 260 shown in FIG. 4 is conventionally etched in order to form a diaphragm 225 based on the DRIE etching process. The diaphragm 225 can be further etched utilizing the KOH etch finishing process in order to form uniform diaphragm thickness. The epitaxial layer controls the thickness of the diaphragm 225 and the edges of the diaphragm 235 are determined by DRIE etch size and the amount of time required to etch from the intermediate DRIE bottom and the etch stopping epitaxial layer. Eliminating the 54.7 degree hole in the back of the wafer 215 can reduce the die size. The hybrid process however, introduces a variable amount of 54.7 degree bevel 250 between the diaphragm edge 235 and the etch pit wall 230 dependent on the amount of over-etching required. FIG. 4 illustrates a side view of the diaphragm pressure sensor 200. The uncertainty of the position of a beveled edge 250 introduces uncertainty in the strain field. Such uncertain beveled portions 250 in major strain/stress areas of the diaphragm 225 may lead to inaccurate sensing of the pressure sensor 200.

Based on the foregoing, it is believed that a need exist for an improved method for etching a diaphragm pressure sensor in order to eliminate the uncertain beveled portion in a stress/strain area of the diaphragm, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved pressure sensor method and system.

It is another aspect of the disclosed embodiments to provide for an improved method for etching a pressure sensor diaphragm.

The aforementioned aspects and other objectives and advantages can now be achieved as described herein. A method for etching a diaphragm pressure sensor based on a hybrid anisotropic etching process is disclosed herein. A substrate (e.g., a silicon wafer) with an epitaxial layer can be etched utilizing an etching process (e.g., a deep reactive ion etching) in order to form a rectangular diaphragm at a selective portion of the substrate. The diaphragm edges can be oriented at an angle (e.g., 45 degree) with respect to the <110> direction on a (100) substrate in order to avoid an uncertain beveled portion in a stress/strain field of the diaphragm. The diaphragm can be further etched utilizing an etch finishing process (e.g., KOH etching) to create an anisotropic edge portion on the major areas of the diaphragm and optimize the thickness and size of the diaphragm. Such an approach provides an enhanced diaphragm structure with respect to a wide range of pressure sensor applications.

The diaphragm can be oriented at 45 degree angle with respect to the substrate so that the non-beveled edge receives high strain/stress due to the applied pressure, while the corners where a bevel might form, receive the least stress/strain of the applied pressure. One or more piezoelectric resistors can be located on the diaphragm of the substrate in order to measure a stress/strain due to the applied pressure on the diaphragm. The orientation of the diaphragm creates the anisotropic etch edge on the regions where the piezoresistors are located and permit control of the final edge by designing the etch feature relative to a longest etch time required to remove any DRIE etch non-uniformity in depth. The uncertain beveling portion formed in the corners of the diaphragm can vary with an amount of difference between the DRIE surface uniformity and etch rate. Such an approach can be effectively employed to construct a simple, cost-effective, and pressure sensitive sensor with good diaphragm thickness control while maintaining minimum chip size.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
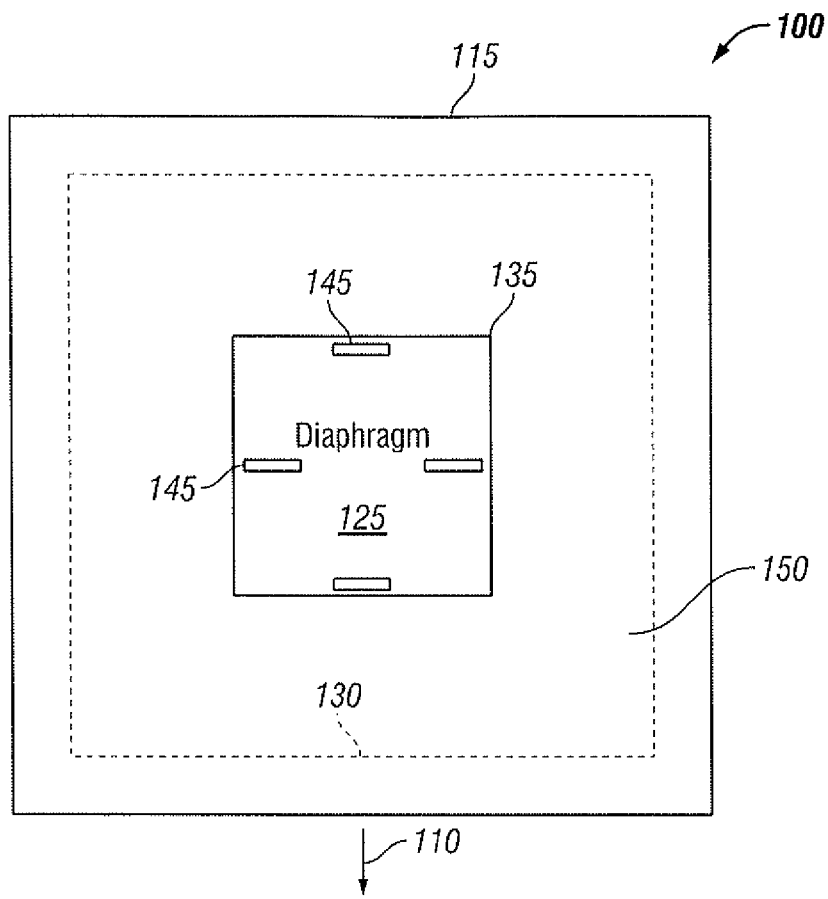
FIG. 1 illustrates a top view of a diaphragm pressure sensor fabricated utilizing a prior art etching process.
Figure 2:
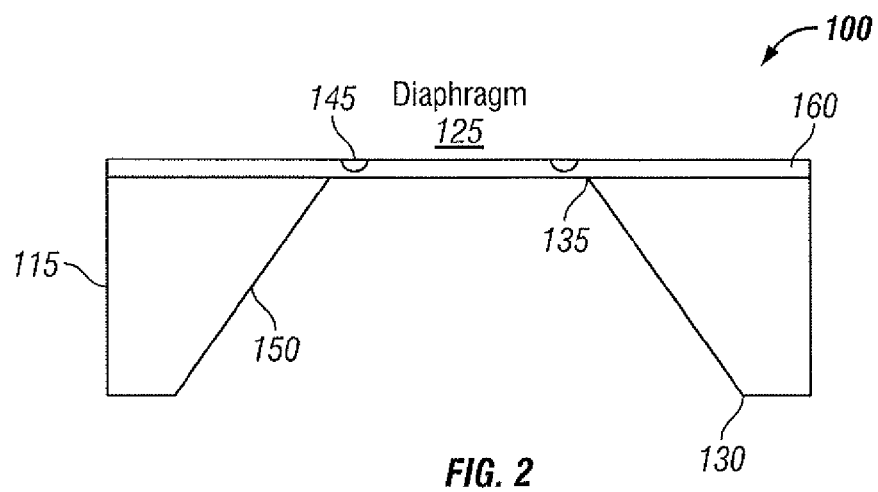
FIG. 2 illustrates a side view of the diaphragm pressure sensor fabricated utilizing a prior art etching process.
Figure 3:
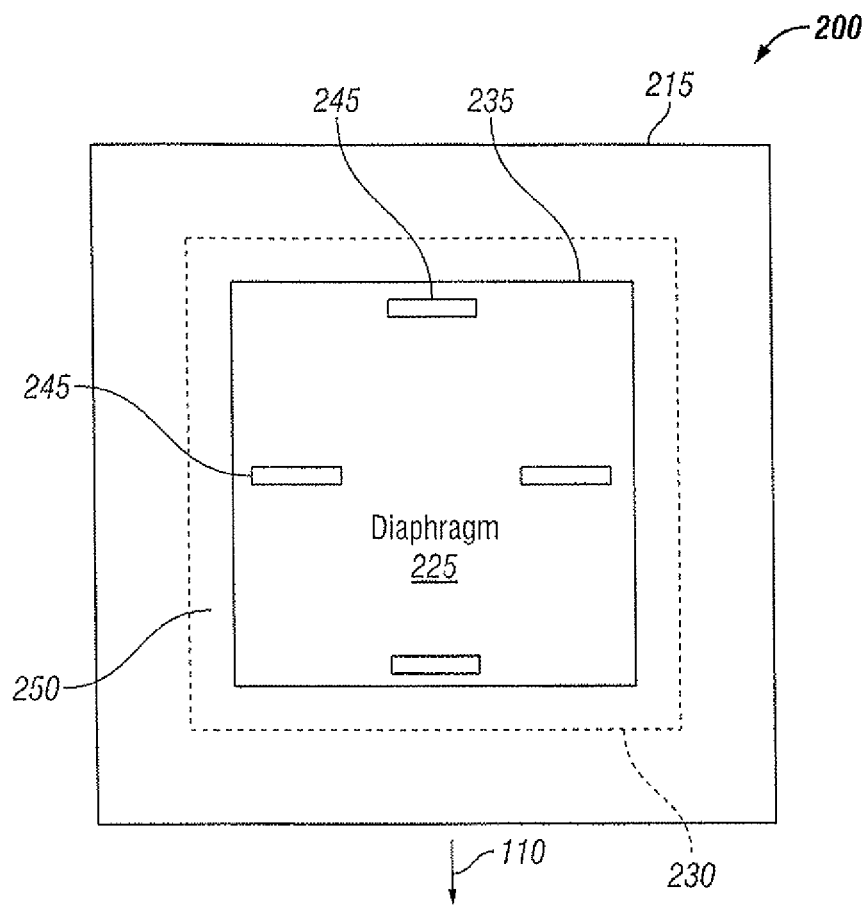
FIG. 3 illustrates a top view of a diaphragm pressure sensor fabricated utilizing a hybrid etching process with the prior art diaphragm orientation.
Figure 4:
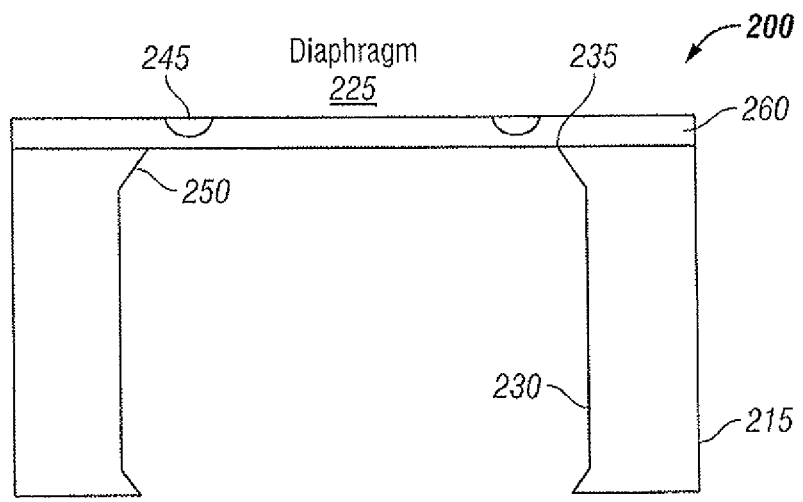
FIG. 4 illustrates a side view of the diaphragm pressure sensor fabricated utilizing a hybrid etching process with the prior art orientation.
Figure 5:
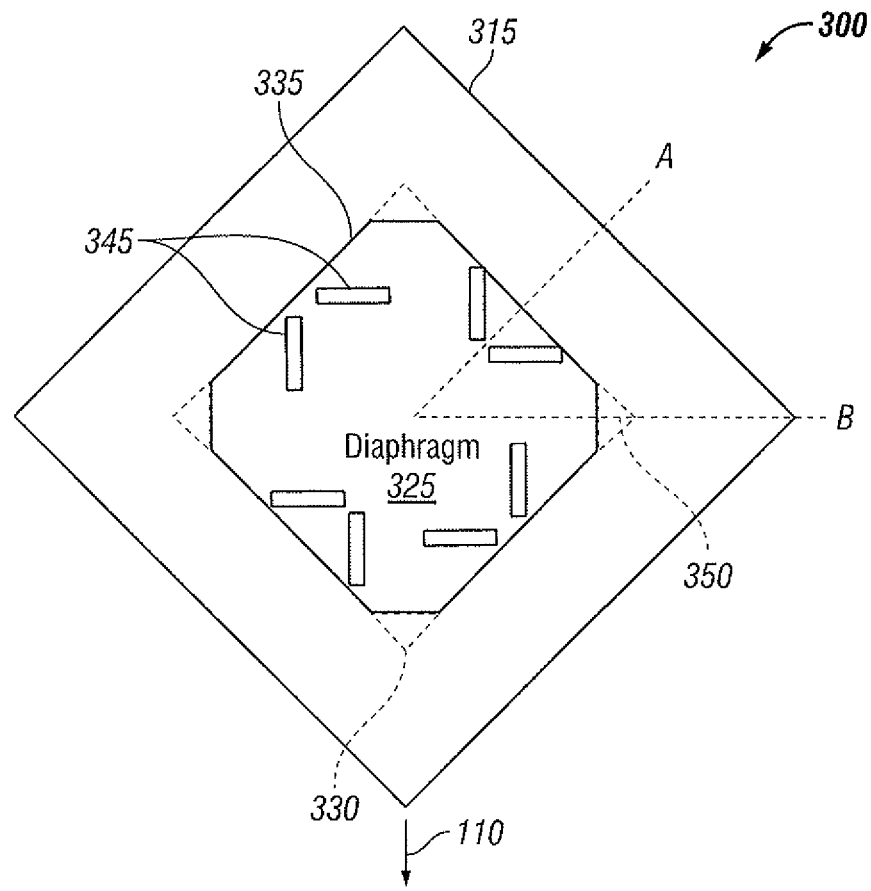
FIG. 5 illustrates a top view of a diaphragm pressure sensor including a diaphragm oriented at an angle, in accordance with the disclosed embodiments.

FIG. 5 illustrates a top view of a diaphragm pressure sensor 300 fabricated at an angle utilizing a hybrid anisotropic etching process, in accordance with the disclosed embodiments. The diaphragm pressure sensor 300 can be generally employed in varying sensing application to measure an applied pressure. The pressure sensor 300 includes a diaphragm 325 etched on a substrate 315 (e.g., a silicon wafer with (100) crystallographic orientation) via the hybrid etching process. The hybrid etching process combines a DRIE (Deep Reactive Ion Etching) etching process and a KOH (Potassium Hydroxide) etch finishing process. Note that the substrate 315 may be configured from a material such as, for example, a silicon material. It can be appreciated, of course, that other types of materials may be utilized in place of the suggested material.

The substrate 315 further includes an upper epitaxial silicon layer 360 doped with a different dopant type than the substrate. The epitaxial layer 360 is a layer whose thickness is key in defining the pressure sensor dynamic range (e.g., about 1.0 to 100.0 micrometers). The etch stop layer 360 inhibits undesirable etching of the diaphragm 325 during the etching process that forms the diaphragm edges 335.

The diaphragm edges 335 can be oriented at 45 degree angle with respect to the substrate 315 <110> orientation in order to create an edge 335 defined by DRIE mask size and anisotropic etch time to avoid uncertainty in a strain field introduced by the uncertainty of the position of an edge 335. The uncertain beveling portions may be formed in a corner 350 of the diaphragm 325 having least stress/strain interaction. The diaphragm 325 is a sheet of a semi-flexible material anchored at its periphery. The diaphragm 325 with respect to the pressure sensor 300 includes an inlet for permitting the passage of the fluids to measure the corresponding pressure.

The diaphragm 325 deflects depending on differences in the applied pressure. The deflection of the diaphragm causes a strain in the silicon which causes a change in the piezoresistors 325.

Figure 6:
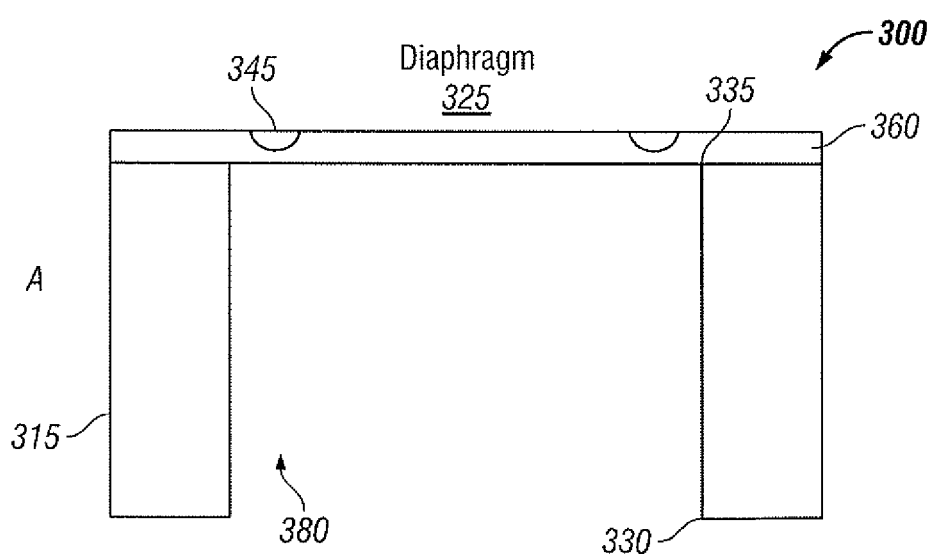
FIGS. 6-7 illustrate a side view of the diaphragm pressure sensor fabricated utilizing the hybrid anisotropic etching process, in accordance with the disclosed embodiments.
Figure 7:
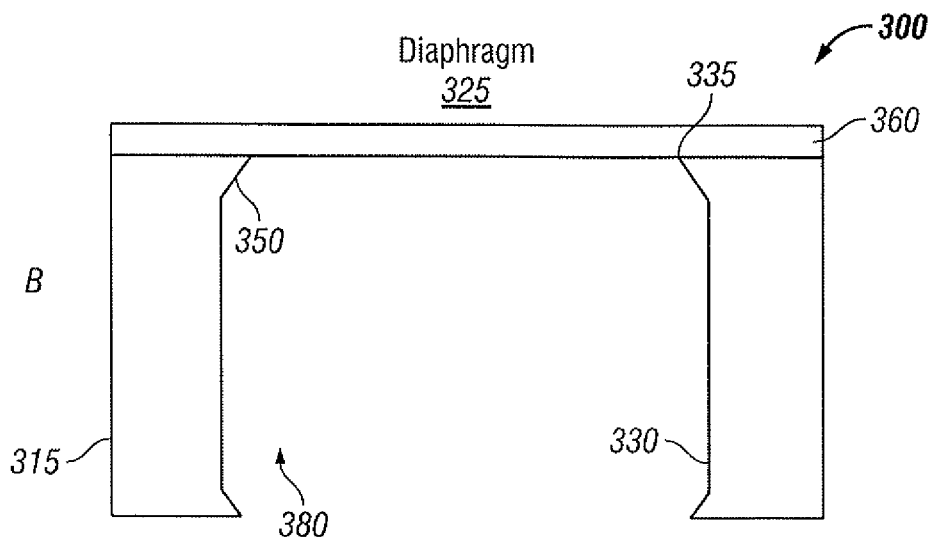
Figure 8:
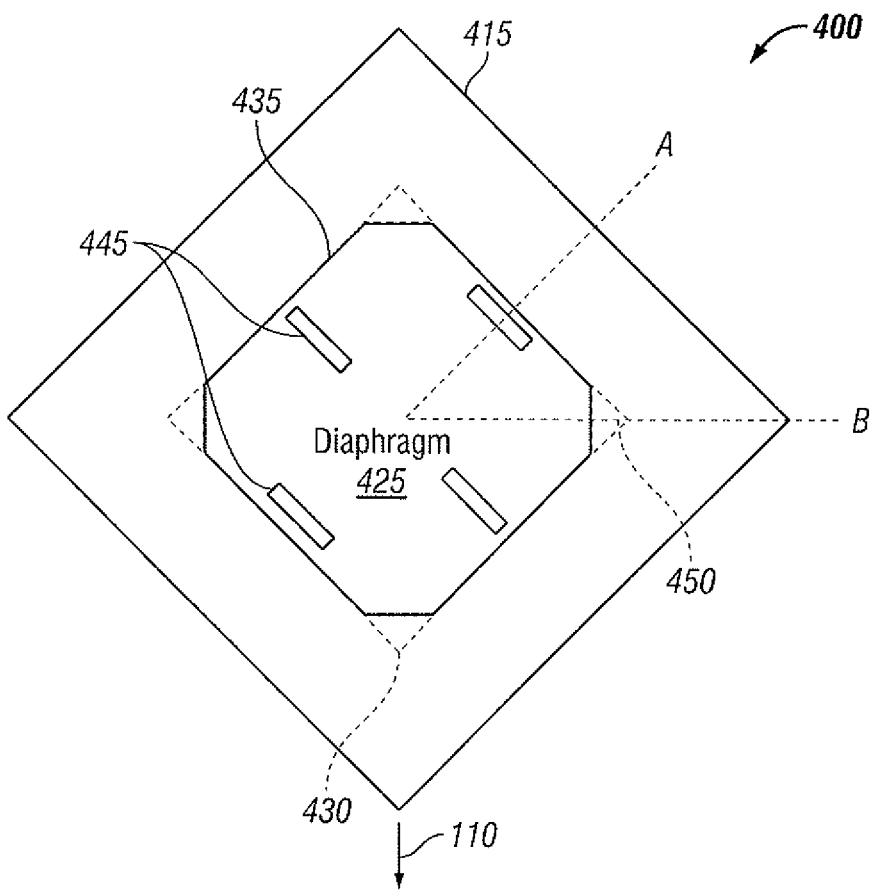
FIG. 8 illustrates a top view of a diaphragm pressure sensor including a diaphragm oriented at an angle and a piezoresistor orientation suitable for n-type resistors in accordance with the disclosed embodiments.

FIGS. 6-7 illustrate a side view of the diaphragm pressure sensor 300 fabricated utilizing the hybrid anisotropic etching process, in accordance with the disclosed embodiments. Note that in FIGS. 1-9 identical parts or elements are generally indicated by identical reference numerals. The diaphragm edges 335 can be oriented at 45 degree angle with respect to the substrate 315 <110> crystal direction so that the non-beveled edge 335 receives high strain/stress due to the applied pressure, while the corners with bevels 350 receive the least stress/strain of the applied pressure.

Figure 9A:
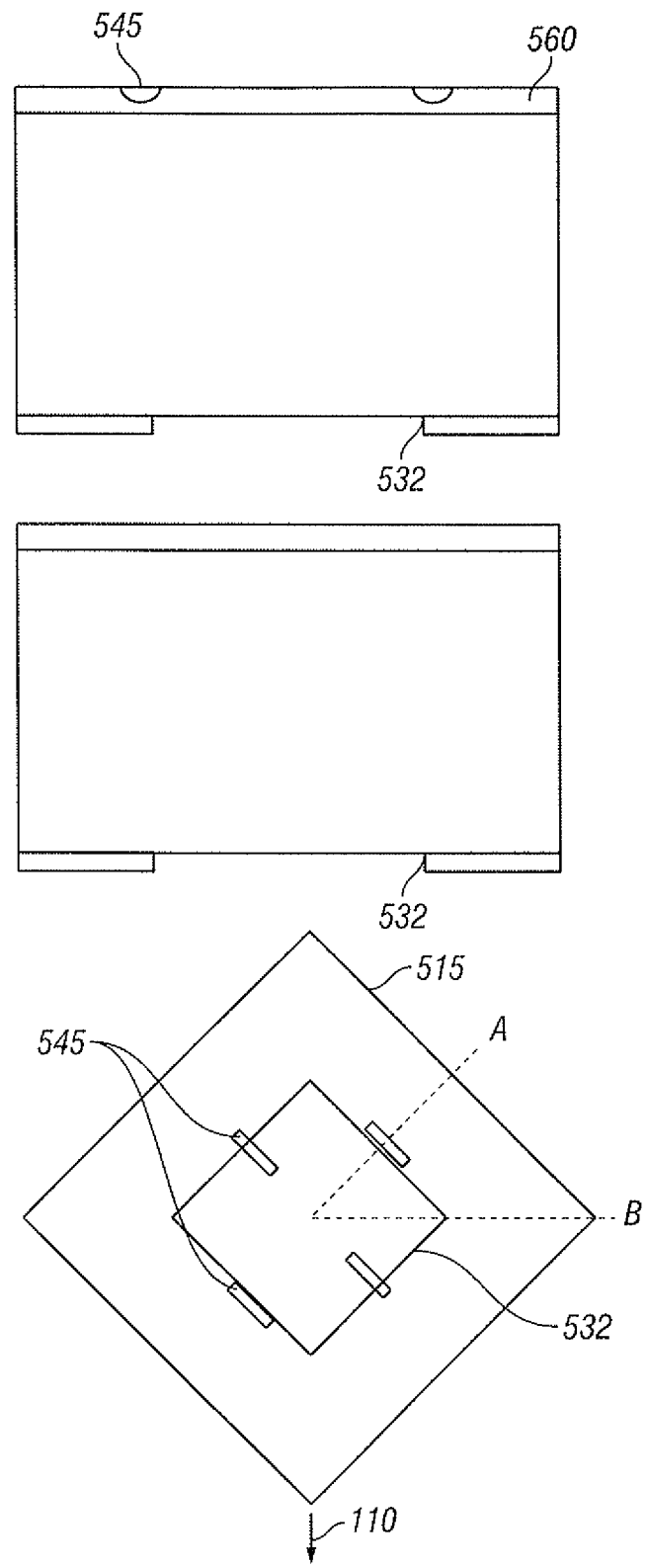
FIG. 9 illustrates successive top views and cross sections as the disclosed process proceeds.
Figure 9B:
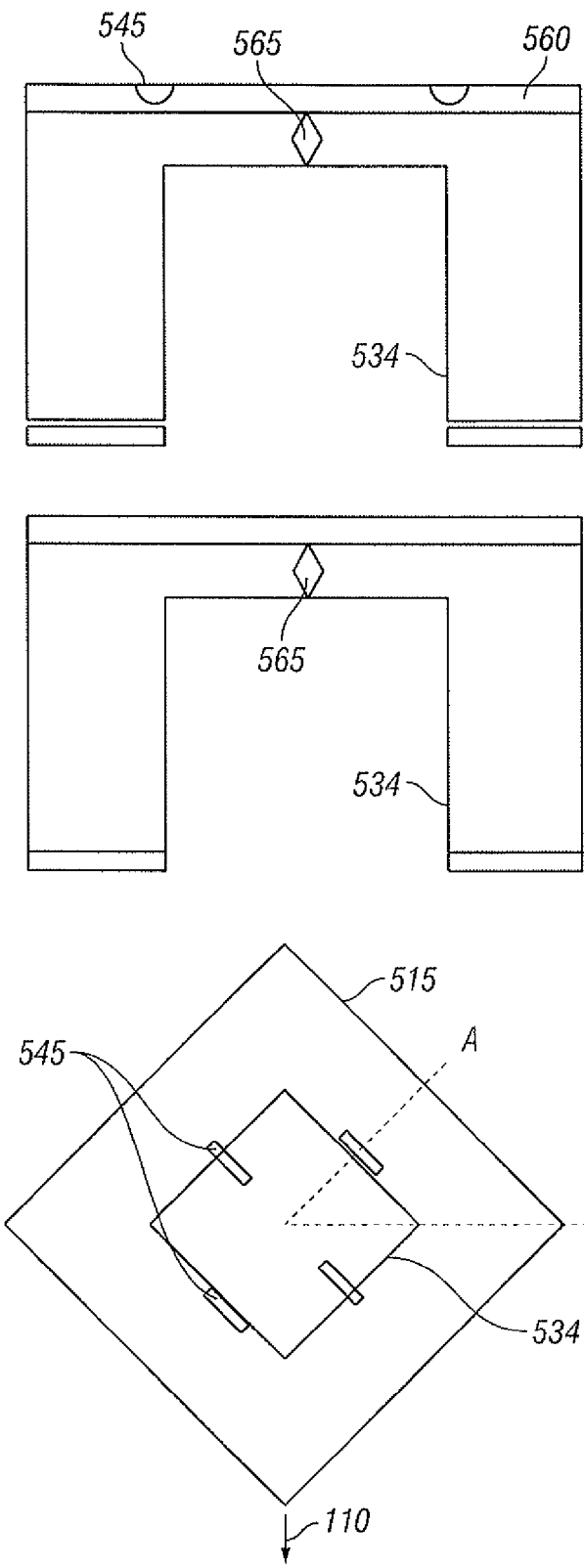
Figure 9C:
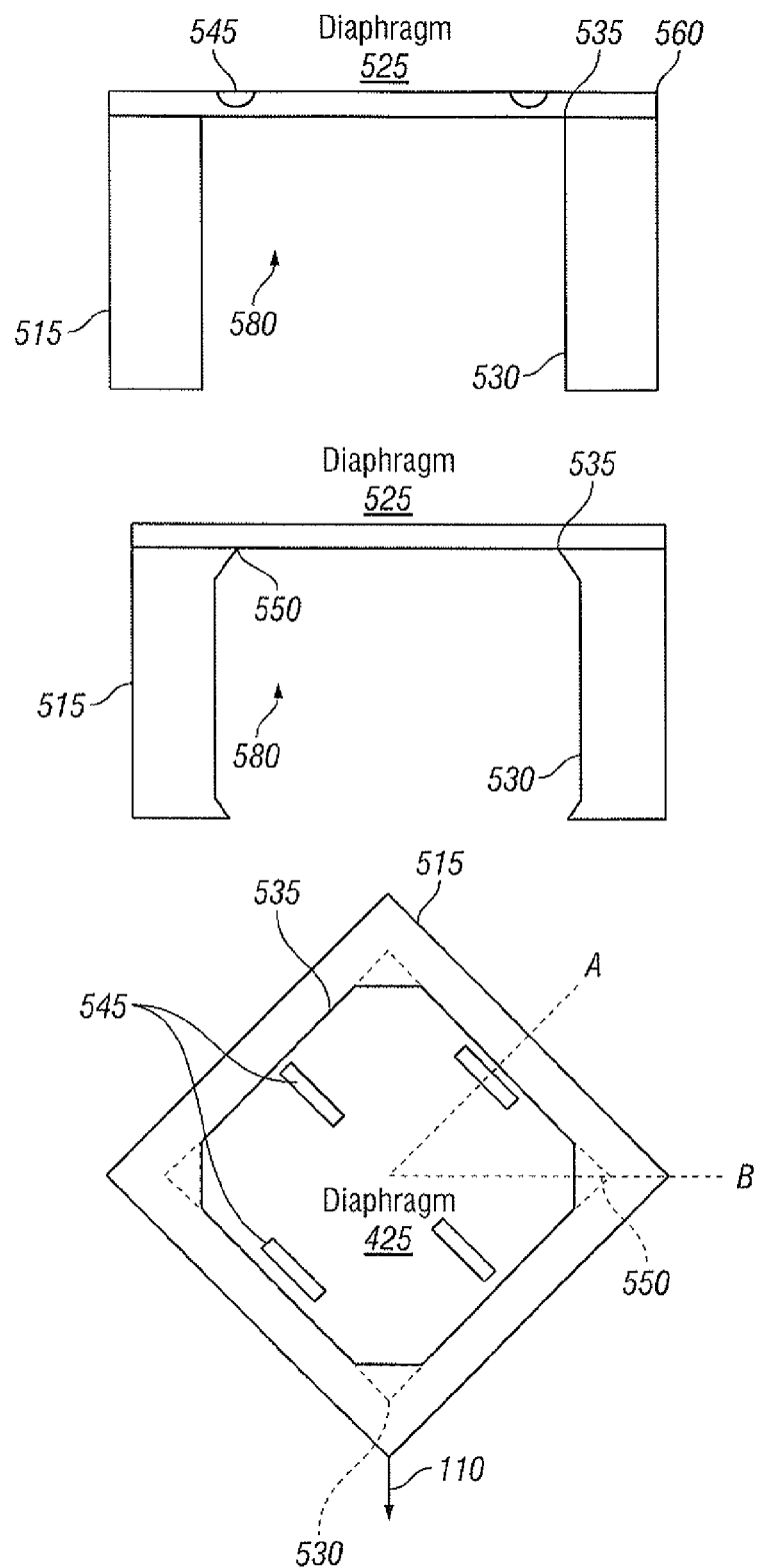

FIG. 9 illustrates in plan view along the right edge and in side views on the left and center how the hybrid etching process would proceed with the angled orientation. View A shown in the first column of FIG. 9 shows the side view of the high strain region of the device. View B shown in the middle column of FIG. 9 shows the side view of the low strain region of the device. In step 1, the first row of FIG. 9, the substrate with piezoresistors 545 and associated metallization and passivation layers on the top surface has a photoresist pattern applied to the backside for the angled opening in the silicon 532. In step 2 the back surface is then etched with deep reactive ion etching (DRIE) to form an etch pit with sidewalls 534 timed to etch within 10 microns of reaching the doped epitaxial layer 560. In step 3 the substrate 515 with a doped epitaxial layer 560 can be etched utilizing anisotropic KOH etch to stop on the epitaxial layer 560 but for a time sufficient to put the diaphragm edge 535 in a precise location relative to the piezoresistor 545 positions. This ability to maintain the diaphragm thickness and independently uniformly control the diaphragm size by the edge placement gives good control on the pressure sensor performance. The uncertainty associated with the corner bevel 550 offers minimal influence on the sensor performance.

The KOH etch is a bulk silicon etch utilized for preferential crystallographic etching of the substrate (preferably silicon wafer substrate). The etch rate of the KOH etch finish process generally depends on the doping and crystallographic orientation of the substrate and the type of concentration utilized for KOH etching. The epitaxial layer thickness 560 controls the thickness of the diaphragm 525, as the KOH does not etch the layer. The diaphragm size is controlled by the DRIE mask size, depth and the amount of KOH time required to remove any remaining silicon 565 between the bottom of the DRIE etched hole and the epitaxial layer. The orientation of the DRIE etch hole is such that as the KOH etch progresses the diaphragm edge 535 maintains the vertical profile shown in the A column of FIG. 9 and the edge moves outward in a uniform and predictable fashion. It is only at the corners where a bevel artifact 550 with 54.7 degree slope is formed commensurate with the amount of silicon removed by the KOH etch as shown in the B column of FIG. 9. The normal rates of etching with respect to the KOH etch finish process can be, in some embodiments, approximately 1 micron (um)/minute. Such a KOH etch finish process with respect to the substrate of the pressure sensor can be accomplished in a constant temperature bath utilizing glassware, such as, for example, quartz. The uncertain beveled portion formed in the corners 550 of the diaphragm 525 can vary with an amount of difference between the DRIE surface uniformity 565 and etch rate. Note that the silicon substrate 515 and the cavity 580 can be etched utilizing the DRIE etching and the KOH etching to achieve control of diaphragm thickness, uniformity, lateral size and the like.

FIG. 5-8 illustrates plan and cross section views of the pressure sensor 300, in accordance with the disclosed embodiments. The pressure sensor 300 includes one or more piezoresistors 345 that are operatively connected with the diaphragm 325. The orientation with respect to the diaphragm 325 avoids uncertainty in the stress field of the diaphragm 325. The piezoresistors 345 can be located in such uniform area of the diaphragm in order to effectively measure stress due to the applied pressure on the diaphragm 325. The piezoresistors 345 may be configured in a certain configuration (e.g., a wheat stone bridge or the like) in order to generate a signal that is proportional to the applied pressure across the diaphragm. The orientation of the diaphragm 325 creates the edge 335 on the regions where the piezoresistors 345 are located and permit control of the final edge by designing the etch feature relative to a longest etch time required to remove any DRIE etch non-uniformity. Note that the edge 335 with respect to the diaphragm 325 can be an anisotropic edge. The pressure sensor 300 further includes a cavity 380 in order to lead the applied pressure to the diaphragm 325. The pressure sensor 400 further includes alternate orientations of the piezoresistors for a different resistor dopant type.

Figure 10:
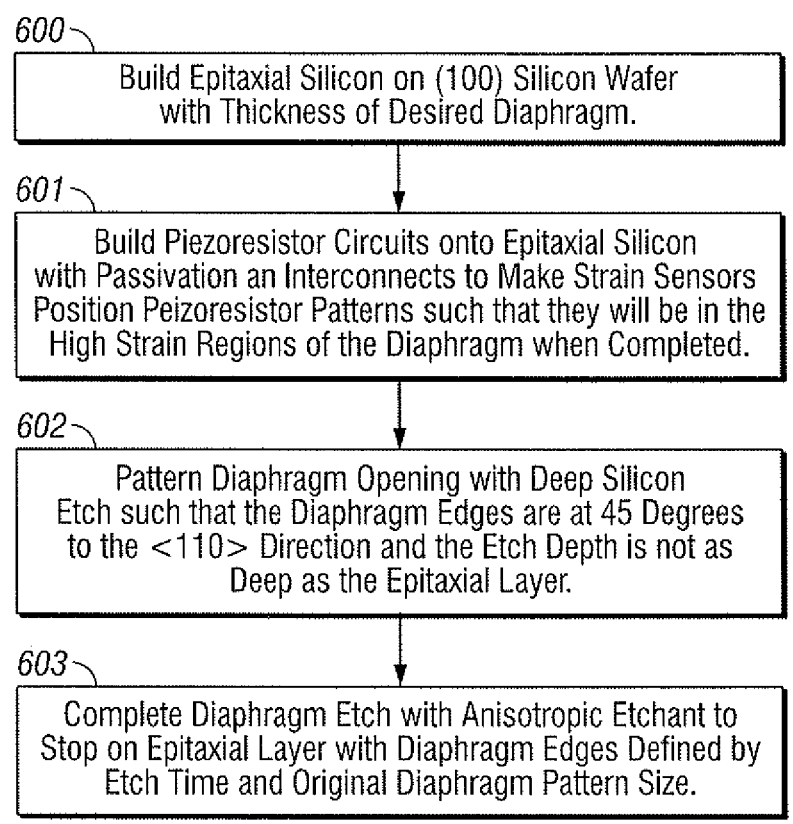
FIG. 10 illustrates a high level flow chart of operations illustrating operational steps of a method for etching the diaphragm pressure sensor based on the hybrid anisotropic etching process, in accordance with the disclosed embodiments.

FIG. 10 illustrates a high level flow chart of operations illustrating operational steps of a method 600 for etching the diaphragm 525 with respect to the pressure sensor 500, in accordance with the disclosed embodiments. The piezoresistors 545 are formed in the epitaxial etch stop layer with any associated passivation and metallization applied to perform the electrical connections for measuring the piezoresistors and placed in the anticipated location of high stress of diaphragm 525 illustrated in block 601. The outlines of diaphragm structure 534 can be oriented at a specific angle with respect to the substrate 515 formed and stopped short of the epitaxial etch stop layer 560 by some margin 565 utilizing the deep reactive ion etching, as illustrated at block 602. The residual silicon 565 can be further removed via the KOH (potassium hydroxide) etch and the edges 535 of the diaphragm 525 etched to size finishing the process in order to optimize diaphragm thickness and size, as indicated at block 603. Such an approach can be effectively employed to construct a simple, cost-effective, and pressure sensitive sensor with good diaphragm thickness control while maintaining minimum chip size.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for etching a diaphragm pressure sensor, said method comprising:
    etching a diaphragm at a selective portion of a substrate with an epitaxial etch stop layer utilizing a deep reactive ion etching process to thereafter orient said diaphragm at an angle with respect to said substrate to avoid an uncertainty in a strain field of said diaphragm;
    configuring an anisotropic portion on said diaphragm via an etch finishing process to optimize thickness and a size of said diaphragm and provide an enhanced diaphragm structure capable of being utilized across a wide range of pressure sensing applications; and
    comprising locating at least one piezoresistor on said diaphragm in order to detect said strain due to an applied pressure on said diaphragm;
    wherein configuring said anisotropic portion on said diaphragm via said etch finishing process further comprises etching said substrate with a doped epitaxial layer utilizing said etching finishing process to stop on said doped epitaxial layer for a time sufficient to locate a diaphragm edge of said diaphragm in a precise location relative to a location of said at least one piezoresistor on said diaphragm.

2. The method of claim 1 further comprising orienting said diaphragm to create said anisotropic etch edge on major areas of said diaphragm where said at least one piezoresistor is located.

3. The method of claim 1 wherein said etch finishing process comprises a potassium hydroxide etch finish process that together with said deep reactive ion etching process comprise a hybrid etching process.

4. The method of claim 3 wherein said substrate comprises a silicon material.

5. The method of claim 3 wherein said angle of orientation with respect to said diaphragm comprises a 45-degree angle.

6. An etched diaphragm pressure sensor apparatus, comprising:
    a diaphragm configured at a selective portion of a substrate with an epitaxial etch stop layer utilizing a deep reactive ion etching process wherein said diaphragm is oriented at an angle with respect to said substrate in order to avoid an uncertain beveled portion in a strain field of said substrate,
    an anisotropic portion formed on a major area of said diaphragm via an etch finishing process in order to optimize thickness and size of said diaphragm; and
    at least one piezoresistor located on said diaphragm to detect strain due to an applied pressure on said anisotropic portion of said diaphragm and provide an enhanced diaphragm structure for use across a wide range of pressure sensing applications;
    wherein said substrate is etched with a doped epitaxial layer utilizing said etching finishing process to stop on said doped epitaxial layer for a time sufficient to locate a diaphragm edge of said diaphragm in a precise location relative to a location of said at least one piezoresistor on said diaphragm.

7. The apparatus of claim 6 wherein said etch finishing process comprises a potassium hydroxide etch finish process that together with said deep reactive ion etching process comprise a hybrid etching process.

8. The apparatus of claim 7 wherein said substrate comprises a silicon material.

9. The apparatus of claim 7 wherein said angle of orientation with respect to said diaphragm comprises a 45-degree angle.

10. An etched diaphragm pressure sensor apparatus, comprising:
    a substrate comprising silicon; a diaphragm formed at a selective portion of said substrate with an epitaxial etch stop layer utilizing a deep reactive ion etching process wherein said diaphragm is oriented at an angle with respect to said substrate in order to avoid an uncertain beveled portion in a strain field of said substrate;
    an anisotropic portion formed on a major area of said diaphragm via an etch finishing process in order to optimize thickness and size of said diaphragm; and
    at least one piezoresistor located on said diaphragm in order to detect strain due to an applied pressure on said anisotropic portion of said diaphragm thereby providing an enhanced diaphragm structure with respect to a wide range of pressure sensing applications;

wherein said substrate is etched with a doped epitaxial layer utilizing said etching finishing process to stop on said doped epitaxial layer for a time sufficient to locate a diaphragm edge of said diaphragm in a precise location relative to a location of said at least one piezoresistor on said diaphragm.

11. The apparatus of claim 10 wherein said etch finishing process comprises a potassium hydroxide etch finish process that together with said deep reactive ion etching process comprise a hybrid etching process.

12. The apparatus of claim 10 wherein said substrate includes an upper epitaxial silicon layer doped with a different dopant type than that of said substrate.

13. The apparatus of claim 10 wherein said angle of orientation with respect to said diaphragm comprises a 45-degree angle.

14. The apparatus of claim 10 wherein said etch finishing process comprises a potassium hydroxide etch finish process and wherein said angle of orientation with respect to said diaphragm comprises a 45 degree angle.

15. The apparatus of claim 10 wherein said diaphragm is oriented to create said anisotropic etch edge on major areas of said diaphragm where said at least one piezoresistor is located.

\* \* \* \* \*